United States Patent [19]
Foll et al.

[11] 3,786,539
[45] Jan. 22, 1974

[54] MULTIPLE TOOL TURRET
[75] Inventors: Gerhard Foll, Esslingen; Heinrich Lahm, Esslingen-Sirnau, both of Germany
[73] Assignee: Index-Werke KG Hahn & Tessky, Esslinger/Neckar, Germany
[22] Filed: Oct. 9, 1970
[21] Appl. No.: 79,483

[30] Foreign Application Priority Data
Oct. 16, 1969  Germany............... P 19 52 050.4

[52] U.S. Cl............................ 29/27, 29/36, 29/54, 29/564
[51] Int. Cl............................................ B23b 7/04
[58] Field of Search............. 29/36, 39, 27, 54, 564; 82/36.1

[56] References Cited
UNITED STATES PATENTS
| | | | |
|---|---|---|---|
| 3,486,209 | 12/1969 | Shultz et al. | 29/36 |
| 2,322,525 | 6/1943 | Kuehn | 29/36 |
| 3,423,812 | 1/1969 | Spur | 29/38 |
| 3,063,311 | 11/1962 | Beckwith et al. | 408/35 |
| 3,610,097 | 10/1971 | Ollearo et al. | 90/14 |
| 3,691,613 | 9/1972 | Walk | 29/27 C |

*Primary Examiner*—Gil Weidenfeld
*Attorney, Agent, or Firm*—Michael S. Striker

[57] ABSTRACT

A turning machine with a rotary work spindle and a slide having a lower carriage movable at right angles to the spindle axis, an upper carriage movable on the lower carriage in parallelism with the axis of the spindle, and a tool support on the upper carriage. The tool support constitutes a vertically reciprocable carriage with several longitudinally extending rows for tool holders, or it may consist of at least one indexible turret with axially parallel and/or radially extending sockets for tool holders. If the tool support consists of several turrets, its turrets are either coaxial or indexible about axes which make an angel of 90 degrees with each other. Each tool turret can have two or more annuli of sockets for tool holders.

5 Claims, 10 Drawing Figures

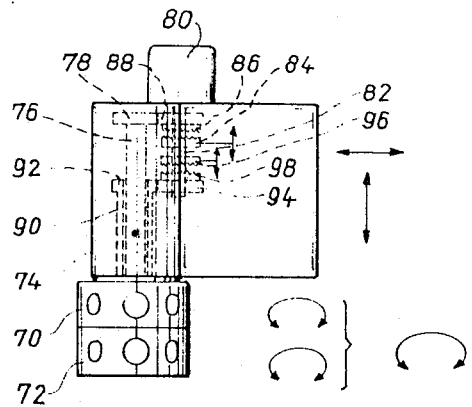
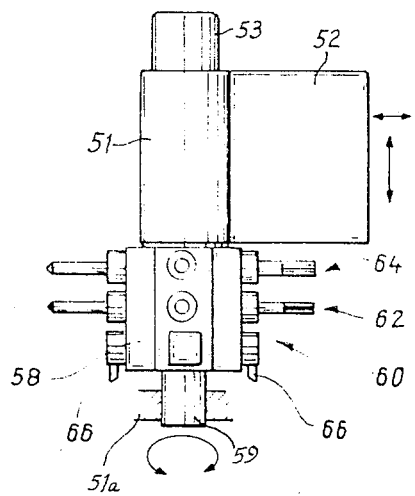
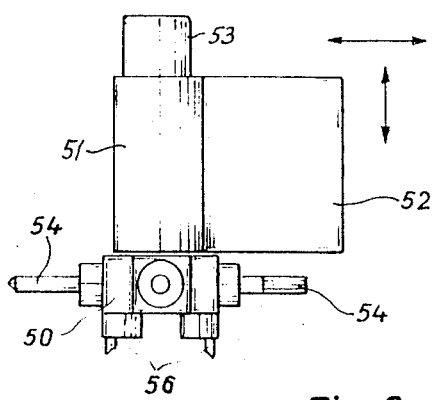
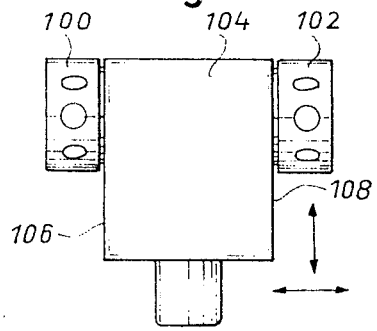
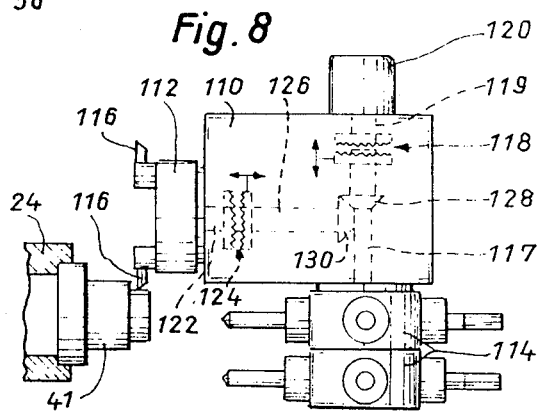

MULTIPLE TOOL TURRET

BACKGROUND OF THE INVENTION

The present invention relates to machine tools in general, and more particularly to improvements in tool supports for use in turning machines, especially in turning machines of the type wherein the tool support is mounted on a slide and the workpiece is held in a rotary work spindle.

Many types of machine tools are provided with automatic tool changers which exchange tools without any supervision or manipulation by the persons in charge. As a rule, such machines are equipped with a tool magazine and the automatic tool changer or tool changers are designed to transport discrete tools between the magazine and the tool holder of the machine. Each tool changer normally operates in such a way that it transports a fresh tool during movement away from the magazine and returns a previously used tool during travel toward the magazine. Tool magazines and automatic tool changers are desirable and practical in large machine tools and in huge production lines but they are less practical or cannot be used at all in relatively small machine tools, for example, in connection with many types of automatic turning machines. The space requirements of a magazine and tool changer are normally such that these parts cannot be readily installed in, on or adjacent to a relatively small turning machine or an analogous machine tool. Moreover, tool magazines and automatic tool changers are not practical for use in machine tools wherein the tools must be exchanged at frequent intervals because the total time which is taken up for exchange of tools constitutes a substantial percentage of the time during which the machine tool is in actual use. This holds especially true when the tool magazine must be installed at a relatively large distance from the working station so that the tool changer must transport the tools along an elongated path. Still further, when the tools must be exchanged at frequent intervals, the likelihood of penetration of foreign matter into the sockets for tools or tool holders is quite pronounced. If a chip, shaving or another foreign particle happens to enter a socket, the tool holder or the tool which is thereupon inserted into the same socket is not held in an optimum position so that the configuration and/or finish of the workpiece is unsatisfactory. It is well known that drills, turning tools and other types of tools which are used in a relatively small automatic turning machine must be interchanged at frequent intervals; consequently, inaccurate finish of workpieces due to penetration of foreign matter into the sockets for such tools or their holders is to be expected if the sockets remain empty for prolonged periods of time or at frequent intervals. Therefore, nearly all presently utilized automatic turning machines employ reciprocable tool carriages or indexible tool turrets which support holders for several material removing tools. It was also proposed to provide the turret or carriage of a machine tool with two or more rows of sockets for tool holders to thereby increase the overall number of tools which can be held in readiness close to the working station. Such mounting of tool holders in several rows renders it possible to treat a workpiece with two tools in a simultaneous operation, for example, to remove material by means of a turning tool and by a borer.

A drawback of the just described machine tools is that the treatment of each type of workpieces necessitates a different setup of tools in the tool support, regardless of whether the tool support constitutes a turret or a carriage. Thus, whenever the machine has completed the treatment of a batch of workpieces and is to treat a batch of different workpieces, the tools in the tool support must be rearranged and/or replaced with different tools. This is due to the fact that, when the tools are mounted in a turret, the latter is merely movable in the axial direction of the work spindle. A tool carriage in presently known machine tools is movable in a direction at right angles to the axis of the work spindle. For example, when the tools are mounted in an indexible turret which is movable only axially of the work spindle, a turning tool which is to remove material from the front end face of a workpiece in the chuck of the work spindle cannot be used in such a machine tool because the turret would be unable to move the turning tool radially of the work spindle.

SUMMARY OF THE INVENTION

An object of the invention is to provide a novel and improved machine tools wherein the tool support can carry a substantial number of tools and tool holders and is mounted in such a way that it contributes significantly to versatility and to the output of the machine tool.

Another object of the invention is to provide a novel and improved tool support for use in turning machines and analogous machine tools wherein a large number of tools can be mounted and held in such a way that the distribution of tools is not dependent on the nature of the workpieces which are to be treated and that each of a large number of tools can be rapidly moved to a requisite position for feeding toward engagement with the workpieces.

A further object of the invention is to provide a tool support which can be mounted on a slide in a machine tool in such a way that it constitutes an inexpensive, compact and lightweight substitute for automatic tool changing systems of presently known design.

An additional object of the invention is to provide a tool support which can be mounted on many presently known machine tools without necessitating appreciable alterations in the design of such machine tools.

A further object of the invention is to provide a tool support wherein the tools and their holders can be conveniently grouped to further facilitate movements of selected tools into engagement with workpieces and to prevent interference by one type of tools when the workpiece is being treated by a tool of another type.

The invention is embodied in a machine tool, particularly in a turning machine, which comprises a frame, a work spindle rotatably mounted in a portion of the frame and having means for holding workpieces which rotate during engagement with tools, a slide including a first carriage which is reciprocably mounted in the frame and a second carriage which is reciprocably mounted on the first carriage, one of the carriages being reciprocable axially of the work spindle and the other carriage being reciprocable radially of the work spindle, and a tool support which is mounted on the second carriage and comprises several groups of sockets or other suitable receiving means for tool holders. The groups preferably form rows of coplanar receiving means and each such group is movable into at least one predetermined plane in which the tools in tool holders supported by the receiving means in the selected group are in an optimum position for engagement with a workpiece in the work spindle.

The tool support may constitute a carriage which is reciprocable on the second carriage of the slide and has two or more parallel rows of receiving means for tool holders. Alternatively, the tool support may comprise a single indexible turret or two or more turrets which may but need not be coaxial with each other and each of which can be pro-vided with at least one row of axially parallel receiving means for tool holders and/or with at least one annulus of receiving means which extend radially of the axis of the turret.

The novel features which are considered as characteristic of the invention are set forth in particular in the appended claims. The improved machine tool itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 4 is a plan view of a portion of another machine tool having a turret-shaped tool support, with one group of receiving means provided in the periphery and another group of receiving means provided in the front end face of the tool support;

FIG. 5 is a similar plan view of a portion of a further machine tool wherein the periphery of the turret-shaped tool support is provided with three groups of receiving means for tool holders and wherein the shaft of the tool support is mounted in two bearings which flank the tool support;

FIG. 6 is a plan view of a portion of another machine tool wherein the tool support comprises two closely adjacent coaxial tool turrets;

FIG. 7 is a plan view of a portion of a further machine tool wherein the tool support comprises two coaxial tool turrets which are separated from each other by a bearing for their shafts;

FIG. 8 is a plan view of a portion of still another machine tool wherein the tool support comprises a twin turret whose axis is normal to and a further turret whose axis is parallel with the axis of the work spindle;

DESCRIPTION OF THE PREFERRED EMBODIMENTS

Figure 1:
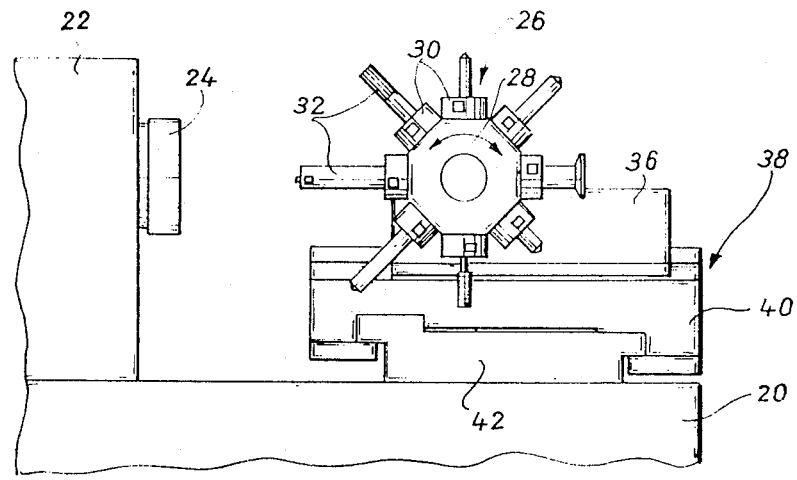
FIG. 1 is a fragmentary side elevational view of a machine tool having a turret-shaped tool support which is constructed and mounted in accordance with a first embodiment of the invention.
Figure 2:
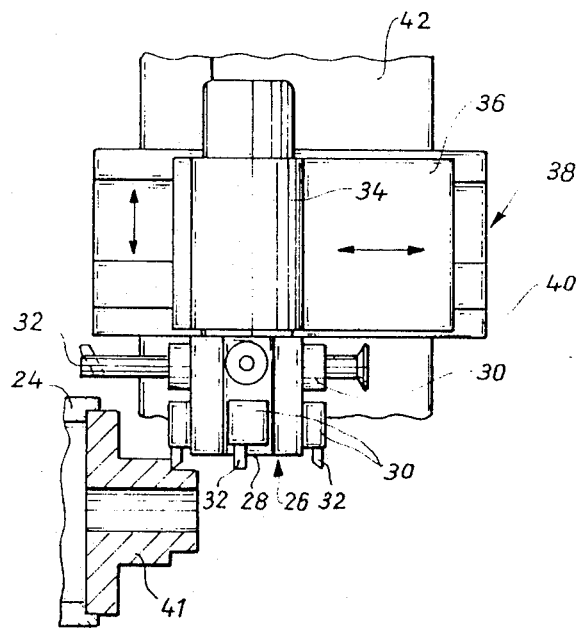
FIG. 2 is a plan view of the structure shown in FIG. 1, further showing a workpiece which is mounted in the work spindle and is being treated by one of the tools whose holders are supported by the receiving means of the turret.

FIGS. 1 and 2 illustrate a portion of a machine tool which comprises a frame 20 having a headstock 22 for a rotary work spindle whose chuck is shown at 24. This chuck supports a workpiece 41 which is rotated about a horizontal axis while in engagement with a material removing tool. The frame 20 is further provided with horizontal ways or guide means 42 extending at right angles to the axis of the work spindle and supporting the first or lower carriage 40 of a cross slide 38. The slide 38 further includes an upper or second carriage 36 which is movable along ways provided on the lower carriage 40 and extending in parallelism with the axis of the work spindle. The carriage 36 mounts a tool support 26 here shown as including a single polygonal turret 28 which is indexible about a horizontal axis normal to the axis of the work spindle. The means for indexing the turret 28 forms no part of the present invention. It is further clear that the illustrated octagonal turret 28 can be replaced with a hexagonal, pentagonal, etc. turret without departing from the spirit of the invention.

Each facet of the peripheral surface of the turret 28 is formed with a pair of receiving means in the form of radial sockets (such as the sockets 44 shown in FIG. 3) serving to receive the male portions of tool holders 30 each of which can carry a different material removing tool 32. The sockets of the turret 28 form two groups each of which includes a row or annulus of eight equidistant coplanar sock-ets so that the turret can support as many as sixteen tools at a time.

The shaft of the turret 28 is mounted in a bear-ing 34 which is mounted on top of the upper carriage 36. In addition to being indexible about its own axis, the turret 28 is movable axially of the work spindle in response to movement of the upper carriage 36 relative to the lower carriage 40, and radially of the work spindle in response to movement of the lower carriage 40 along the ways 42. This enables the person in charge to place each of the two rows or groups of tool holders 30 into at least one predetermined plane in which the respective tools are in an optimum position for engagement with and for removal of material from the revolving workpiece 41. The tools 32 in the outer row or group of tools holders 30 (i.e., in the lower row, as viewed in FIG. 2) are intended to remove material from the exterior of the workpiece 41. The tools 32 in the inner group or row of tool holders 30 (nearer to the bearing 34) are intended to remove material from the interior of the workpiece 41. The illustrated tools 32 in the outer row of tool holders 30 are conventional turning tools whose bits are shown as extending from the respective tool holders.

The aforedescribed mobility of the turret 28 (with reference to the carriage 36, with the carriage 36 relative to the carriage 40, and/or with the carriages 36, 40 relative to the frame 20) renders it possible to employ two or more adjacent tools in any one of the two rows simultaneously with each other or to employ each tool independently of all other tools (including those which are immediately adjacent to the selected tool). Thus, the improved tool support 26 serves as a convenient, cheaper and more compact substitute for a conventional tool magazine of the type from which the tools can be removed one after the other for delivery to the tool support prior to engagement with a workpiece. An important advantage of the tool support 26 over such tool magazines is that it can operate without tool changers and also that the tools 32 in each of the groups or rows can be distributed at random rather than in a predetermined sequence in dependency on the nature of workpieces as is customary in conventional tool magazines).

In the position shown in FIG. 2, one of the tools 32 in the outer row is in the process of reducing the diameter of the foremost end of the workpiece 41. All of the tools 32 of the outer row are located in a plane in which each of these tools can be indexed into material removing engagement with the workpiece. The selected tool is thereupon fed by moving the upper carriage 36 and the turret 28 with reference to the lower carriage 40 or by moving the carriages 36, 40 and the turret 28 with reference to the ways 42. By moving the carriage 36 to the right, as viewed in FIG. 2, and by thereupon moving the carriages 36, 40 downwardly, as viewed in FIG. 2, the tools 32 of the inner row (nearer to the bearing 34) can be placed into a plane in which a selected tool can be moved into proper position for engagement with the workpiece 41 in response to indexing of the turret 28 by one or more steps. It will be seen that the tools 32 of the outer or inner row need not be distributed in dependency on the nature of workpieces and that any one of these tools can be moved into an appropriate position with reference to the workpiece 41 or any other workpiece which can be properly held by the chuck 24.

It is clear that the movements of the carriages 36, 40 and the indexing of the turret 28 can be controlled by a suitable programming system of any known design. The feature that the tools 32 for external treatment of workpieces are assembled in one of the rows and that the tools 32 for external treatment of workpieces are assembled in a second row reduces the likelihood that the tool or tools of one row would interfere with the treatment of a workpiece by one or more tools of the other row, or vice versa. As shown in FIG. 2, the tools 32 of the inner row are sufficiently remote from the tools 32 of the outer row so that they cannot interfere with the operation of the tool which is shown in material removing engagement with the workpiece 41. Analogously, when one of the tools 32 in the inner row is caused to move into material removing engagement with the workpiece 41, the tools 32 of the outer row are out of the way and permit unimpeded internal treatment of the workpiece. The leftmost tool 32 in the inner row of tools shown in FIG. 2 is sufficiently remote from the workpiece 41 and from the chuck 24 to permit removal of material by the tool 32 which is shown in engagement with the workpiece 41 all the way to the outer end face of the chuck as well as all the way to the bore of the workpiece. This is so despite the fact that the diameter of the leftmost part of the workpiece 41 greatly exceeds the diameter of its median and rightmost parts. If the workpiece 41 is replaced with a smaller-diameter workpiece, the likelihood that one of the tools 32 in the inner row would interfere with the operation of a tool 32 in the outer row is even more remote. Thus, the selected tool 32 of the outer row can be moved radially of the chuck 24 all the way to the axis of the smaller-diameter workpiece. If the configuration of a workpiece is such that a tool 32 in the inner row would possibly interfere with the operation of a tool 32 in the outer row, the socket behind the selected tool 32 of the outer row is simply left empty. With reference to FIG. 2, the holder 30 for the leftmost tool 32 of the inner row can be removed while the axially aligned tool 32 of the outer row removes material from the workpiece 41. This enables the tool 32 which engages the workpiece 41 to reduce the latter's diameter to one which only slightly exceeds the diameter of the bore in the workpiece. In the event that the workpiece 41 is replaced with a solid workpiece (without an axial bore), the selected tool 32 of the outer row can remove from such solid workpiece material all the way to the axis of the chuck 24, provided that the associated tool holder of the inner row is temporarily removed from its socket.

Figure 3:
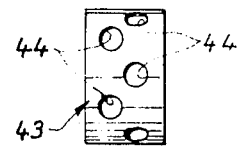
FIG. 3 is a side elevational view of a second turret-shaped tool support.

FIG. 3 illustrates a modified tool support 43 which constitutes a cylindrical turret having a cylindrical peripheral surface provided with two rows or groups of radially extending receiving means in the form of sockets 44 each of which can receive a portion of a tool holder. It will be noted that the sockets 44 of the two rows are staggered with reference to each other, as considered in the circumferential direction of the tool support 43. This renders it possible to place the two rows closer to each other and to thus reduce the axial length of the tool support. This tool support can be used in the machine tool of FIGS. 1 and 2 in place of the polygonal turret 28. The tool support 43 of FIG. 3 is particularly suited for use in relatively small turning machines or analogous machine tools.

The sockets 44 of at least one of the rows of sockets shown in FIG. 3 can be provided with groove-like extensions, or the turret 43 can be provided with tongues extending axially of and into the respective sockets 44. The sockets are then capable of receiving tool holders 30 in such a way that the tool holders are movable radially of the turret 43 but cannot rotate in their sockets. Suitable mechanisms can be provided to effect axial adjustments of tool holders in their sockets. Such types of sockets are particularly suited for reception of holders for tools 32 which are intended to remove material from the exterior of a workpiece. Referring again to FIG. 2, it will be noted that the tools 32 in the outer row of receiving means in the turret 28 extend beyond the front end face of the turret. This is desirable because the front end face of the turret cannot interfere with the feeding of the tools in the outer row toward the workpiece 41.

Referring to FIG. 4, there is shown the upper carriage 52 of a cross slide whose lower carriage can be mounted on the ways of a frame in the same way as shown for the carriage 40 of FIG. 1. The upper carriage 52 supports a bearing 51 for the shaft of a turret-shaped tool support 50 which is indexible by a suitable motor 53 in a manner not forming part of the invention. The tool support 50 is of polygonal shape and each of its facets is provided with a single socket (not shown) for a holder of a tool 54 whereby such sockets form a group or row of coplanar receiving means located in a plane which is normal to the axis of the tool support 50. The latter has a front end face (which faces away from the upper carriage 52) and is provided with at least two additional sockets or receiving means extending in parallelism with the axis of the tool support 50. If the front face of the tool support 50 is provided with two sockets only, they are preferably disposed mirror symmetrically to each other with reference to the axis of the tool support. In the embodiment of FIG. 4, the sockets in the front face of the tool support 50 carry holders to tools 56 which are designed to remove material from the exterior of a workpiece. The tools 54 are designed to remove material from the interior of a workpiece. Such distribution of tools 54 and 56 is of advantage because the tools 56 cannot interfere with the tools 54 during removal of material even in the event of excessive penetration of a tool 54 into the workpiece, or vice versa.

FIG. 5 illustrates a portion of a further machine tool wherein the tool support 58 constitutes a polygonal turret with three rows or groups of sockets or receiving means for three sets of tool holders 60, 62, 64. The shaft 59 of the tool support 58 is mounted in the bearing 51 of the upper carriage 52 and in a further bearing 51a so that the three groups of tools are disposed between the two bearings. The directions in which the tool support 58 can move with the carriage 52 are indicated by double-headed arrows. The tool holders 60 in the outermost row or group of sockets support tools 66 for removal of material from the exterior of workpieces. It is to be noted that the second bearing 51a constitutes an optional feature of the machine tool shown in FIG. 5 and that the tool support 43 of FIG. 3 can also be mounted in two bearings (if necessary). The construction of FIG. 5 is particularly suited for use in relatively small machine tools wherein the diameter of the tool support 58 cannot be increased beyond a certain value. Therefore, if the tool support is to carry a substantial number of tool holders, its axial length is selected in such a way that it can be formed with several rows or groups of coplanar sockets whereby the number of such rows can exceed the illustrated number. Relatively small and compact tool turrets are desirable in smaller machine tools to reduce their inertia during indexing and during movement with the carriage or carriages of the slide. The numeral 53 denotes the motor which serves to index the tool support 58.

It is further clear that, in each of the illustrated embodiments, the tools for internal and external treatment of workpieces can be assembled in a common row. For example, if the tool support 58 of FIG. 5 has four sides and hence a total of twelve sockets for tool holders, and if such a tool support is to carry only two tools for removal of material from the exterior of workpieces, the outermost row of sockets can receive the two holders for the external tools and two holders for internal tools. Thus, the tool support 58 can carry as many as 10 internal tools and a substantially smaller number of external tools. As a rule, when a machine tool is to treat relatively small workpieces, the number of tools for internal treatment exceeds the number of tools which serve to remove material from the exterior of small workpieces. The fact that the diameter or the maximum transverse dimension of the tool support 58 is rather small does not affect its versatility because, when the internal tools are to treat relatively small workpieces, they cannot interfere with each other even though their holders are located in immediate proximity of each other.

FIG. 6 illustrates the upper carriage 73 of a cross slide which serves as a means for supporting a composite tool support comprising two coaxial cylindrical turrets 70, 72. Each of these turrets has a single row of radially extending receiving means or sockets 71 for tool holders (not shown). In accordance with a feature of the invention, the turrets 70, 72 can be indexed simultaneously or independently of each other. The shafts 76, 90 of the turrets 72, 70 are mounted in a bearing 74 on the upper carriage 73 and the inner end of the shaft 76 carries a gear 78 which meshes with a gear 88 on the output shaft 82 of a prime mover here shown as an electric motor 80 supported by the carriage 53. The output shaft 82 carries a clutch having a clutch element 84 which shares all angular movements of the shaft 82 but is movable axially therealong into or from engagement with a complementary clutch element 86 secured to the gear 88. The gear 88 and its clutch element 86 are freely rotatable on the output shaft 82 but are held against axial movement. Thus, when the operator desires, the clutch element 84 is moved into mesh with the clutch element 86 whereby the thus engaged clutch transmits torque to the shaft 76 of the turret 72.

The shaft 90 of the turret 70 is a hollow cylinder which surrounds a portion of the shaft 76 and carries a gear 92 meshing with a gear 94 on the output shaft 82. The gear 94 can rotate on but is held against axial movement relative to the shaft 82 and is rigid with the clutch element 98 of a second clutch further including a clutch element 96 which rotates with and is movable axially of the shaft 82 into or from engagement with the clutch element 98. The means for moving the clutch elements 84, 96 into and from engagement with the clutch elements 86, 98 form no part of the present invention. It is further clear that the illustrated claw clutches can be replaced with electromagnetic or other types of clutches. The operator of the machine tool is free to engage one or both clutches to thus activate the respective power train(s) and to allow for indexing of the turret 70 or 72 independently of the other turret or for simultaneous indexing of both turrets.

At least one of the turrets 70, 72 can be provided with several rows of sockets. For example, one of these turrets can be replaced with the turret 43 of FIG. 3. Also, the power trains between the prime mover 80 and the turrets 70, 72 can be modified in a number of ways.

FIG. 7 illustrates a portion of a further machine tool wherein the bearing 104 on the upper carriage of a cross slide again supports a composite tool support having two coaxial cylindrical tool turrets 100, 102. However, the two turrets are remote from each other, i.e., they are disposed at the opposite sides of the bearing 104. The sides 106, 108 of the bearing 104 which are respectively adjacent to the turrets 100, 102 are preferably parallel to each other. The turrets 100, 102 can be indexed with or independently of each other.

In the embodiment of FIG. 8, the bearing 110 on the upper carriage (not shown) of a slide carries a composite tool support which includes a first (single) turret 112 and a second (twin) or duplex turret 114. The axis of the turret 112 is parallel to the axis of the work spindle whose chuck is shown at 24, and this turret is provided with at least two receiving means or sockets which are machined into its front end face and accommodate holders for turning tools 116 designed to remove material from the exterior of the workpiece 41. The holders for the two illustrated tools 116 are disposed diametrically opposite each other with reference to the axis of the turret 112.

The twin or duplex turret comprises two immediately adjacent discrete turrets of identical size and shape, and each of these discrete turrets is provided with a row of equidistant radial receiving means for the holders of tools which are designed to remove material from the interior of the workpiece. The axis of the twin turret 114 is normal to the axes of the work spindle and turret 112. It is clear that the periphery of the turret 112 can be provided with at least one row of equidistant coplanar sockets for additional tool holders or that such peripheral sockets can be provided in place of sockets in the front end face of the turret 112. Also, at least the outer turret of the twin turret 114 can be provided with axially parallel sockets in place of or in addition to the peripheral sockets, and at least one turret of the twin turret 114 can be provided with at least two rows of peripheral sockets which may but need not be staggered in a manner as shown in FIG. 3.

The shaft 117 of the twin turret 114 is journalled in the bearing 110 and can be coupled to the output shaft 119 of an electric motor 120 by a claw clutch 118. The shaft 117 further carries a bevel gear mating with a bevel gear 130 on an intermediate shaft 126 which is coaxial with the shaft 122 of the turret 112. The shafts 122, 126 can be coupled to or uncoupled from each other by a claw clutch 124. In this embodiment of the invention, the twin turret 114 can be indexed by the motor 120 independently of or together with the turret 112, but the turret 112 cannot be indexed independently of the turret 114. However, it is equally within the purview of the invention to mount the bevel gear 128 on the output shaft 119 so that the latter can directly drive the intermediate shaft 126; this insures that the tool turret 112 can be indexed with as well as independently of the turret 114. The claw clutches 118, 124 can be replaced with electromagnetic or other types of clutches.

The use of twin turrets is particularly desirable in relatively small machine tools wherein the diameter of the turret cannot exceed a predetermined value. In order to provide room for a large number of tool holders, the multiplex turret can comprise two or more immediately adjacent discrete turrets each having at least one group or row of receiving means for tool holders. The sockets in one turret of a twin turret may but need not be in axial alignment with sockets in the other turret. Thus, the sockets in the twin turret 114 can be staggered in a manner as shown in FIG. 3.

The feature that the turrets 112, 114 are indexible with or independently of each other enables the operator or a programming device to select a practically infinite number of sequences in which the tools are moved into engagement with workpieces. The indexing times are rather short, especially if the turret 112 carries a relatively small number of external tools and if the turret 114 supports tool holders in several rows.

Figure 9:
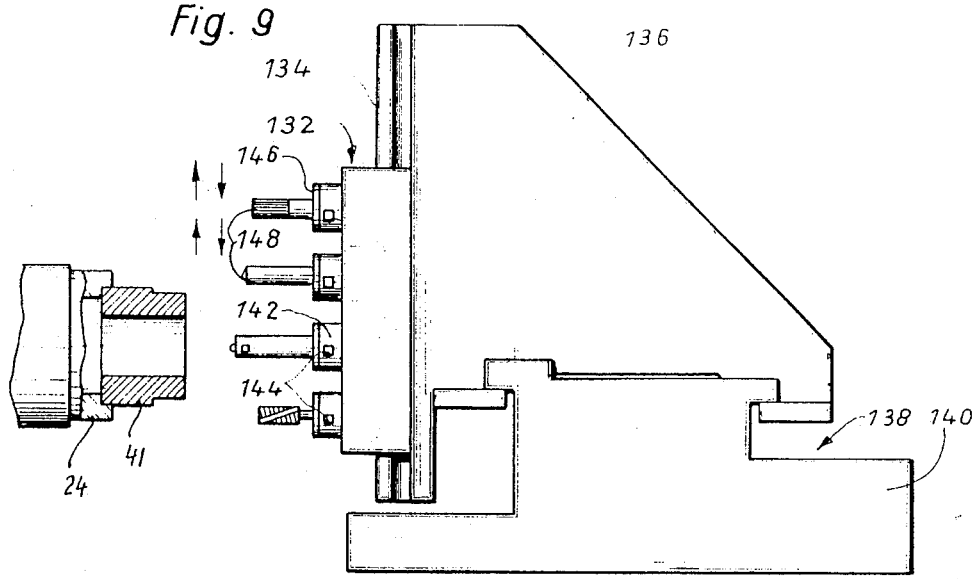
FIG. 9 is a fragmentary side elevational view of a machine tool wherein the tool support comprises a carriage which is reciprocable along a vertical path in front of the work spindle.
Figure 10:
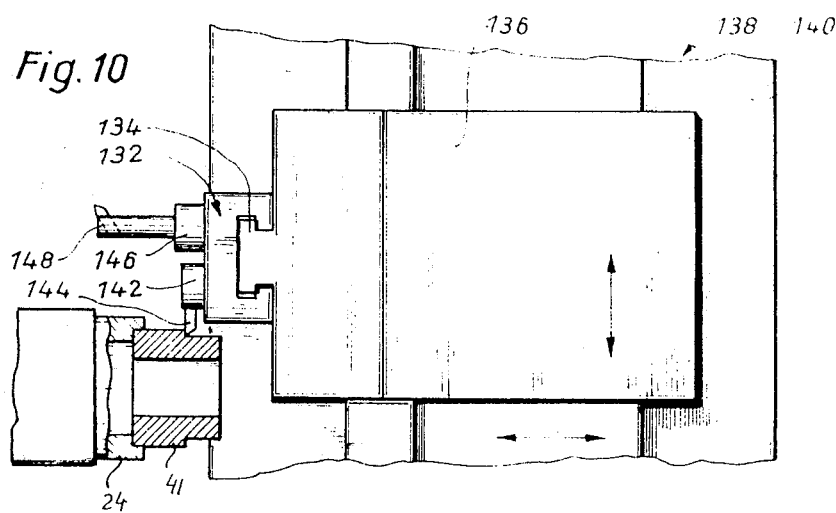
FIG. 10 is a plan view of the structure shown in FIG. 9.

Referring finally to FIGS. 9 and 10, there is shown a portion of a machine tool whose slide 138 comprises a lower carriage 140 and an upper carriage 136. The chuck of the work spindle is shown at 24 and the workpiece at 41. The carriages 136, 140 respectively correspond to the carriages 36, 40 of the slide 38 shown in FIGS. 1 and 2. In this machine tool, the tool support comprises a carriage 132 which is reciprocable along vertical guide means or ways 134 provided on the front side of the carriage 136. Thus, the carriage 132 is reciprocable at right angles to the direction of reciprocatory movement of the carriage 140 or 136 and at right angles to the axis of the work spindle. The carriage 132 can be moved by hand or by a motor or transmission, not shown.

The carriage 132 is provided with several (for example, two) vertical rows or groups of receiving means or sockets for tool holders 142, 146. The tool holders 142 are disposed in one of the illustrated rows and carry tools 144 for removal of material from the exterior of the workpiece 41. The other row of sockets accommodates the tool holders 146 which carry tools 148 for removal of material from the interior of the workpieces. By moving the carriages 132, 136 with reference to the carriage 140, the operator can move either of the two rows of tool holders into a plane in which the respective tools 144 or 148 are in an optimum position for removal of material from a workpiece 41 in the chuck 24. By moving the carriage 132 up or down, the operator can move a selected tool in the previously selected row into a proper position with reference to the workpiece. Radially operating tools are fed by moving the carriage 136 with reference to the carriage 140. Axially operating tools are fed by moving the carriage 140 with reference to the frame (not shown).

It is clear that the illustrated placing of the slide 138 in front of the chuck 24 represents but one of several locales for this or an analogous tool support. For example, the slide 138 can be mounted laterally of the chuck 24 and the two or more rows of sockets can be provided in one side face (rather than in the front face) of the carriage 132.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a machine tool, a combination comprising a frame; a work spindle rotatably mounted on said frame for carrying a workpiece to be machined; a slide including a first carriage reciprocably mounted on said frame and a second carriage reciprocably mounted on said first carriage, one of said carriages being reciprocable substantially axially and the other carriage substantially radially of said work spindle; tool support means mounted on said second carriage and comprising at least two discrete tool turrets indexibly mounted on said second carriage and each provided with at least one group of receiving means for tool holders; a prime mover; a first power train receiving motion from said prime mover and arranged to index one of said turrets; and a second power train receiving motion from said prime mover and arranged to index the other of said turrets, each of said power trains comprising discrete clutch means operable to respectively connect and disconnect the respective turret from said prime mover so that each of said turrets is indexible with or independently of the other.

2. In a machine tool, a combination comprising a frame; a work spindle for carrying a workpiece to be machined, said work spindle being mounted on said frame rotatable about a first axis; a slide including a first carriage reciprocably mounted on said frame and a second carriage reciprocably mounted on said first carriage, one of said carriages being reciprocable substantially axially of and the other carriage substantially radially of said work spindle; and tool support means mounted on said second carriage and comprising a first turret indexible with respect to said second carriage about a second axis located in a plane including said first axis, said first turret being provided with at least two groups of receiving means for tool holders, said at least two groups being disposed in parallel planes spaced in the direction of said second axis from each other, said tool support means further comprising at least a second turret indexibly mounted on said second carriage about an axis which is normal to the axis of said first turret, said second turret having at least one group of tool receiving means and said second carriage being provided with bearings for said turrets.

3. A combination as defined in claim 2, wherein one of said first and second turrets is a multiplex turret having several groups of receiving means.

4. In a machine tool, a combination comprising a frame, a work spindle rotatably mounted on said frame for carrying a workpiece to be machined; a slide including a first carriage reciprocably mounted on said frame and a second carriage reciprocably mounted on said first carriage, one of said carriages being reciprocable substantially axially and the other carriage substantially radially of said work spindle; and tool support means mounted on said second carriage and comprising at least two discrete tool turrets indexibly mounted on said second carriage about two axes extending substantially normal to each other and located in a plane including said first axis, each of said turrets being provided with at least one group of receiving means for tool holders, one of said turrets having a front end face and the axis about which it is indexible is parallel to the axis of said work spindle, the receiving means of said one turret including at least two axially parallel sockets provided in the front end face of said one turret.

5. A combination as defined in claim 4, wherein said two sockets are disposed diametrically opposite each other with reference to the axis of said one turret.

* * * * *